No. 722,895. PATENTED MAR. 17, 1903.
B. E. PRESTON.
GREEN PEA SHELLER.
APPLICATION FILED MAY 12, 1902.
NO MODEL.

WITNESSES.
INVENTOR.
Burton E. Preston
BY
ATTORNEY.

UNITED STATES PATENT OFFICE.

BURTON E. PRESTON, OF DENVER, COLORADO.

GREEN-PEA SHELLER.

SPECIFICATION forming part of Letters Patent No. 722,895, dated March 17, 1903.

Application filed May 12, 1902. Serial No. 106,850. (No model.)

*To all whom it may concern:*

Be it known that I, BURTON E. PRESTON, a citizen of the United States of America, residing at Denver, in the county of Arapahoe and State of Colorado, have invented certain new and useful Improvements in Green-Pea Shellers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in a device for shelling green peas, my object being to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

Figure 1:
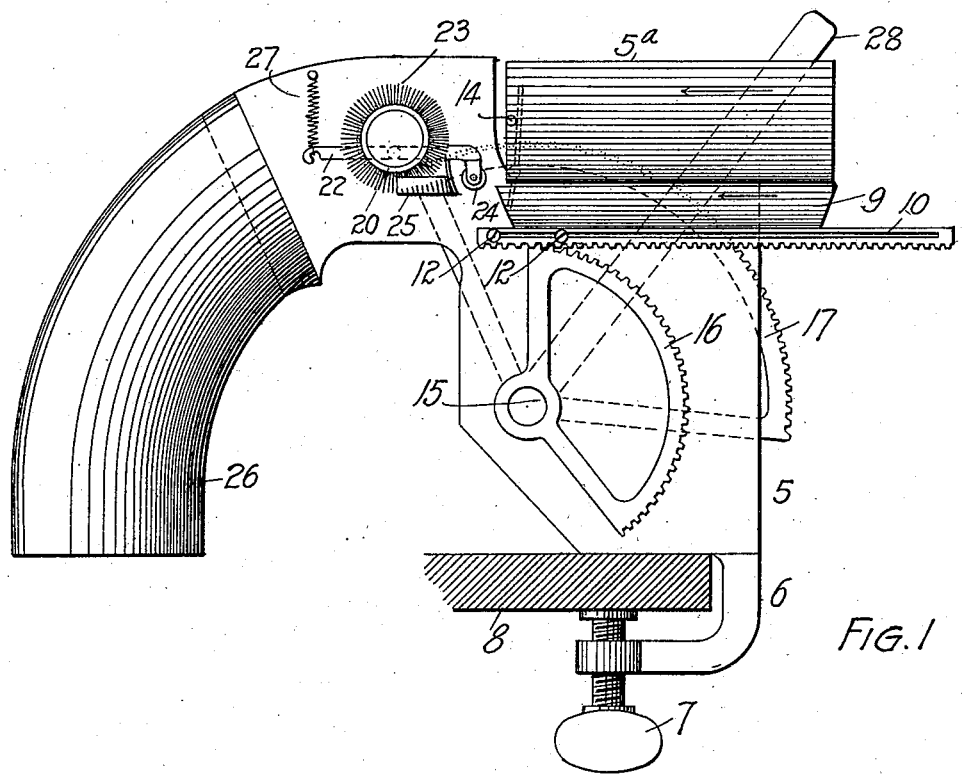
Figure 2:
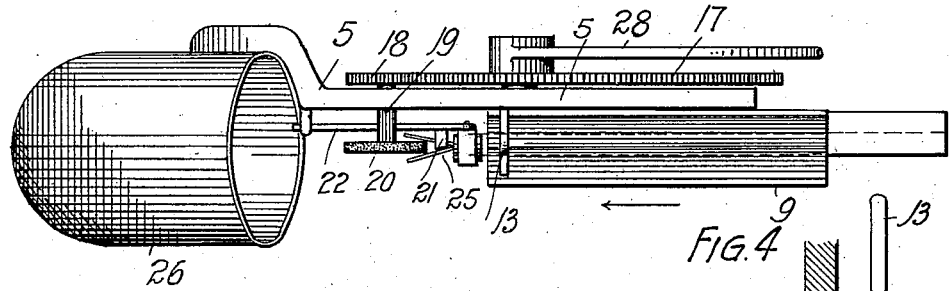
Figure 3:
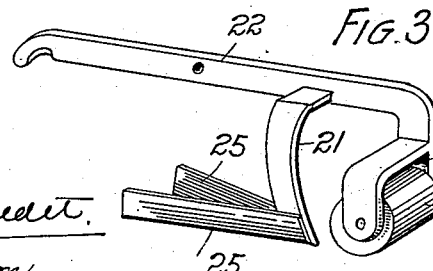
Figure 4:
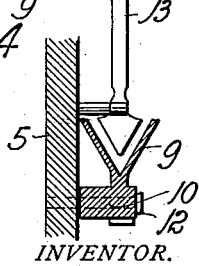

In the drawings, Figure 1 is a side elevation of my improved device. Fig. 2 is a top or plan view of the same. Fig. 3 is a perspective view of a lever carrying a knife or cutter and a roller forming a part of my improved construction. Fig. 4 is an end view of a part of the construction.

The same reference characters indicate the same parts in all the views.

Let the numeral 5 designate a plate forming the framework of the device and integral with which is formed a sort of mouth or hopper 5ª. This plate is provided with a depending hook-shaped arm 6, in which a thumb-bolt 7 is threaded for clamping the device to a table 8 or other suitable support. Slidably mounted on the frame below the hopper 5ª is a V-shaped trough 9, provided with a cogged rack 10, which is provided with a slot through which are passed screws 12, which form guides for the rack and trough as the latter are moved back and forth, as hereinafter explained. The screws 12 enter threaded openings formed in the frame-plate. This trough is open at both ends and is adapted to receive a pea-pod lying on its "back," so to speak. Fulcrumed on the frame-plate and projecting into the front end of the trough is a lever-like device 13, having a V-shaped lower extremity projecting in front of the pod when the trough is at its rearward limit of movement, as shown in the drawings. As the trough is moved forward, or in the direction of the arrow in Figs. 1 and 2, the pod engages the lower extremity of the lever and turns the latter on its fulcrum, since the lever moves freely in the direction indicated by the arrow in Fig. 1, but is locked against movement in the opposite direction by a stop-pin 14, secured to the frame. After the trough is moved far enough forwardly to allow the lower extremity of the lever 13 to drop behind the pea-pod therein, the lever will remove the pod from the trough as the latter is moved rearwardly, or in the direction opposite that indicated by the arrow in Figs. 1 and 2. Journaled on the frame-plate, below the trough, is a spindle 15, upon which are mounted two segmental gears 16 and 17, one being located on each side of the plate 5. The gear 16 meshes with the cogged rack 10 and moves the trough forward and back as the spindle is given partial rotations in reverse directions. The gear 17 meshes with a pinion 18, fast on a spindle 19, journaled in the frame-plate and carrying a brush 20 at its opposite extremity. This brush is in line and directly in front of the trough, and its function is to remove the peas from the pod after the latter has been opened by a knife or cutter 21, mounted on a lever 22, fulcrumed on the frame at 23. This lever is provided with an arm 22ª, which projects downwardly between the knife and the front extremity of the trough when the latter is in the rearward position. This arm 22ª carries a roller 24, which is adapted to engage the pea-pod from above and hold the latter in position while the knife is performing the opening function. The lower extremity of this knife is provided with two separating-wings 25, which diverge from each other as they extend forwardly, forming a sort of double wedge adapted to open the pod as the trough is moved in the direction of the arrow thereon. These wings straddle the rotary brush and hold the pod open until the brush enters and removes the peas, which are carried into a conduit 26, mounted on the frame and curved downwardly to direct the peas into a suitable receptacle. The conduit 26 is made fast to the frame-plate. To the forward extremity of the lever 22 is connected a coil-spring 27, whose normal tendency is to throw the roller extremity downwardly. By reason of this construction the knife or cutter is adapted for opening pea-pods of various sizes. If the pod is very large, the latter will raise the roller and knife and prevent the latter from penetrating the pod far enough to cut the peas, since the cutting of the peas within the pod is not desirable.

To the spindle 15 is made fast an operating lever-arm 28.

From the foregoing description the operation of the device will be readily understood. Assuming that the pea-pod is placed in the trough, when the latter is in the position shown in the drawings the lever 28 will be moved in the direction indicated by the arrow in Fig. 1, causing the gears 16 and 17 to actuate the trough 9 and the brush 20 simultaneously. As the trough is moved forwardly it carries the pea-pod to engagement with the knife 21, which is arranged to enter the pod just far enough to open it without cutting the peas. As soon as the knife begins the opening movement the wings, which extend forwardly from the knife in the shape of a wedge, spread the pod parts sufficiently to allow the brush to enter and remove the peas, as heretofore explained. As soon as the trough has moved to its forward limit the lower extremity of the lever 13 drops behind the rear extremity of the pod and sweeps it out of the trough as the latter is given the reverse movement, which is accomplished by moving the lever 28 in the direction opposite that indicated by the arrow in Fig. 1.

Having thus described my invention, what I claim is—

1. In a green-pea sheller, the combination with a suitable frame, of a pea-pod holder mounted to reciprocate, a pod-opener located in the path of the pod-holder as the latter is moved forwardly, said opener consisting of a wedge-shaped knife adapted to support the pod after an incision is made, and a rotary brush for removing the peas from the open pod.

2. In a green-pea sheller, the combination with a suitable frame, of a pod-holder mounted to reciprocate thereon, a pod-opener located in the path of the holder, and comprising a knife having forwardly-extending wings arranged in the form of a wedge to spread the pod-opening after an incision is made by the knife, and suitable means for removing the peas from the pod as the latter is moved forwardly with the holder.

3. In a green-pea sheller, the combination with a suitable frame, of a pod-holder mounted to move thereon, a knife located in the path of the holder and having forwardly-extending wings arranged in the form of a wedge, the said knife being adapted to form an incision in the pod and spread the latter open as it is moved forwardly, and means mounted in the plane of the knife for removing the peas from the open pod.

4. In a green-pea sheller, the combination with a suitable frame, of a V-shaped trough adapted to receive a pea-pod lengthwise, a cogged rack on the trough, a gear for operating the rack, a spindle journaled in the frame and upon which the gear is made fast, a second gear also fast on the spindle, a second spindle journaled in the frame, a pinion fast on the second spindle and meshing with the second gear, a brush fast on the second spindle and occupying a position in the plane of the pod-carrying trough, and a knife located in the rear of the brush and adapted to form an incision in the pod as the trough is moved forwardly, and an operating lever-arm attached to the spindle carrying the two gears.

5. In a green-pea sheller, the combination with a suitable frame, of a pea-pod holder, a pod-opener located adjacent the pod-holder, one of said parts the holder or the opener being mounted to reciprocate, a rack mounted on the reciprocating part, a gear engaging said rack and adapted to impart the reciprocating movement, and suitable means for removing the peas from the pod.

6. In a green-pea sheller, the combination with a frame, of a pod-holder slidable thereon, a knife located in front of the holder, a spring-held lever upon which the knife is mounted, a roller carried by the lever and located in the rear of the knife, for holding the pod during the opening and shelling operation, and a device projecting into the pod-holder and arranged to swing forwardly from its normal position as the pod is brought into contact therewith, and to drop behind the pod to its normal position when the holder has traveled forwardly a sufficient distance, the said device being locked against swinging rearwardly from its normal position, whereby as the holder is moved rearwardly, the pod will be removed therefrom, substantially as described.

In testimony whereof I affix my signature in presence of two witnesses.

BURTON E. PRESTON.

Witnesses:
A. J. O'BRIEN,
DENA NELSON.